United States Patent [19]
Rognon

[11] Patent Number: 4,759,180
[45] Date of Patent: Jul. 26, 1988

[54] HEAT EXCHANGING EXHAUST MANIFOLD

[76] Inventor: Armand Rognon, Verneuil sous Coucy, 02380 Coucy le Chateau Auffrique (Aisne), France

[21] Appl. No.: 941,419

[22] Filed: Dec. 15, 1986

[30] Foreign Application Priority Data

Dec. 16, 1985 [FR] France .................................. 85 18587

[51] Int. Cl.[4] .............................................. F01N 3/04
[52] U.S. Cl. ........................................ 60/321; 165/74
[58] Field of Search ...................... 60/320, 321; 165/74

[56] References Cited

U.S. PATENT DOCUMENTS

| | | | |
|---|---|---|---|
| 923,226 | 6/1909 | Whiteway | 60/320 |
| 2,888,251 | 5/1959 | Dalin | 165/74 |
| 4,426,844 | 1/1984 | Nakano | 60/320 |

FOREIGN PATENT DOCUMENTS 135313 8/1983 Japan ...................................... 60/320

Primary Examiner—Douglas Hart
Attorney, Agent, or Firm—Stevens, Davis, Miller & Mosher

[57] ABSTRACT

A heat exchanging exhaust manifold is provided, including a manifold casing for collecting the exhaust gases of an internal combustion engine having a rack mounted for sliding inside said manifold casing. The rack includes a water flow cooling circuit. Such a manifold is used with all internal combustion engines whose exhaust gases must be cooled, and in particular with the engines used on oil drilling platforms.

2 Claims, 3 Drawing Sheets

HEAT EXCHANGING EXHAUST MANIFOLD

BACKGROUND OF THE INVENTION

The present invention relates to an exhaust manifold with a heat exchanger for an internal combustion engine, including means for gathering the exhaust gases of the engine together towards a discharge means, and means for cooling the gases.

Such a heat exchanger manifold is used for collecting and cooling the exhaust gases of internal combustion engines, with discharge thereof to the outside through discharge means of a known type. Such manifolds are used, for example, on oil drilling platforms.

Such manifolds are already known in which the gases are collected by a manifold of a conventional type, about which is disposed a jacket through which flows a cooling fluid, generally water.

Because the cooling means, in these known manifolds, are disposed outside the manifold, about the path of the gases, the cooling efficiency is mediocre and the gases are insufficiently cooled when they arrive at the inlet of the discharge means.

The present invention aims at overcoming this drawback.

SUMMARY OF THE INVENTION

The invention provides for this purpose a manifold of the above defined type, wherein the cooling means are mounted removably inside the manifold means.

In the manifold of the invention, the cooling of the gases is efficient for the cooling means, instead of being disposed about the path of the gases, are disposed in the path itself. The clogging up of the cooling means which results from such an arrangement does not lead to an extended shut down of the engine, for, because the cooling means are removably mounted inside the manifold means the clogged cooling means may be rapidly replaced by fresh cooling means, so as to allow the clogged up cooling means to be cleaned and maintained while the engine is again in operation. The invention provides then efficient cooling of the exhaust gases without appreciable reduction of the time during which the engine is usable.

In a preferred embodiment, the cooling means are secured to a rack mounted for sliding inside the manifold means.

Advantageously, means are provided for controlling the stopping of the engine, actuated by the movement of the cooling means.

In this case, even if an operator, desiring to proceed with maintenance and cleaning of the cooling means, does not take the precaution of stopping the internal combustion engine, it is automatically stopped as soon as the cooling means are removed, thus avoiding, in the frequent case of using such a manifold in an explosive atmosphere, for example on oil drilling platforms, any risk of explosion by communication of the exhaust gases with the explosive ambient atmosphere, through the opening formed in the manifold means for the passage of the cooling means. The safety in use of such a manifold is then total.

BRIEF DESCRIPTION OF THE DRAWINGS

The present invention will be better understood from the following description of a preferred embodiment of the exhaust manifold of the invention, with reference to the accompanying drawings in which.

DESCRIPTION OF THE PREFERRED EMBODIMENT

Figure 1:
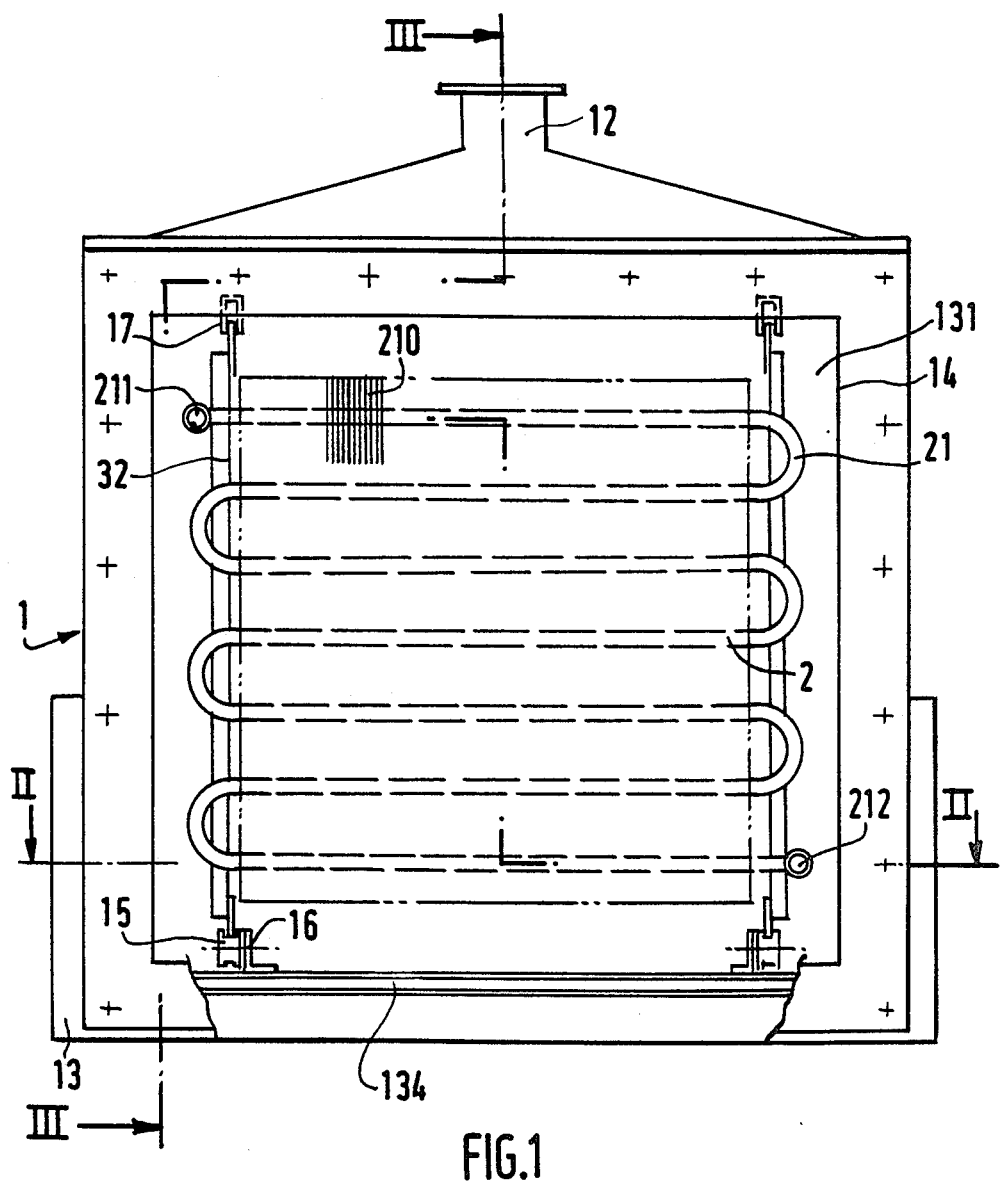
FIG. 1 shows a front view of an exhaust manifold without a cover.
Figure 2:
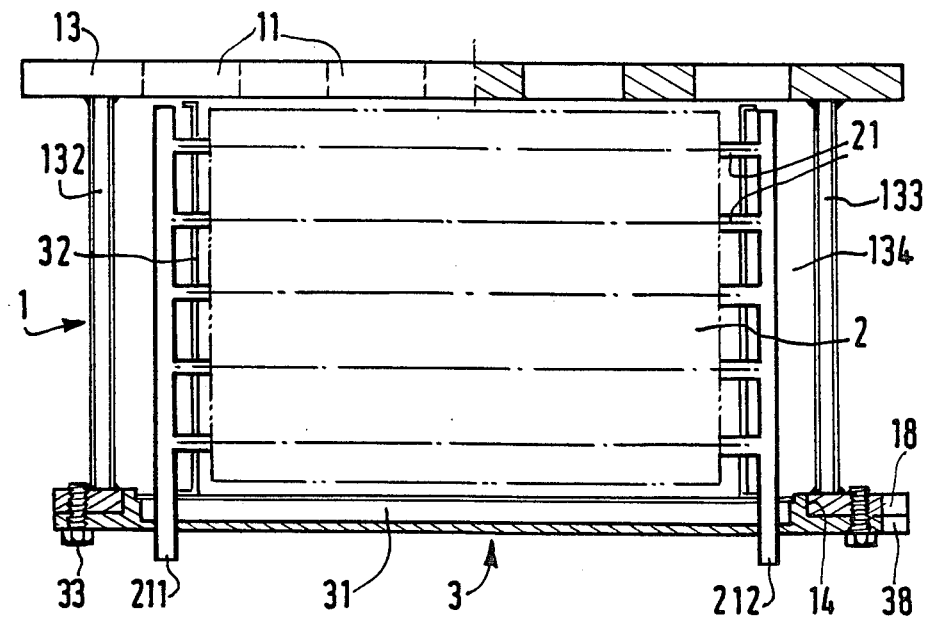
FIG. 2 shows a top view, in section through line II—II of the manifold of FIG. 1, the cover being in position.
Figure 3:
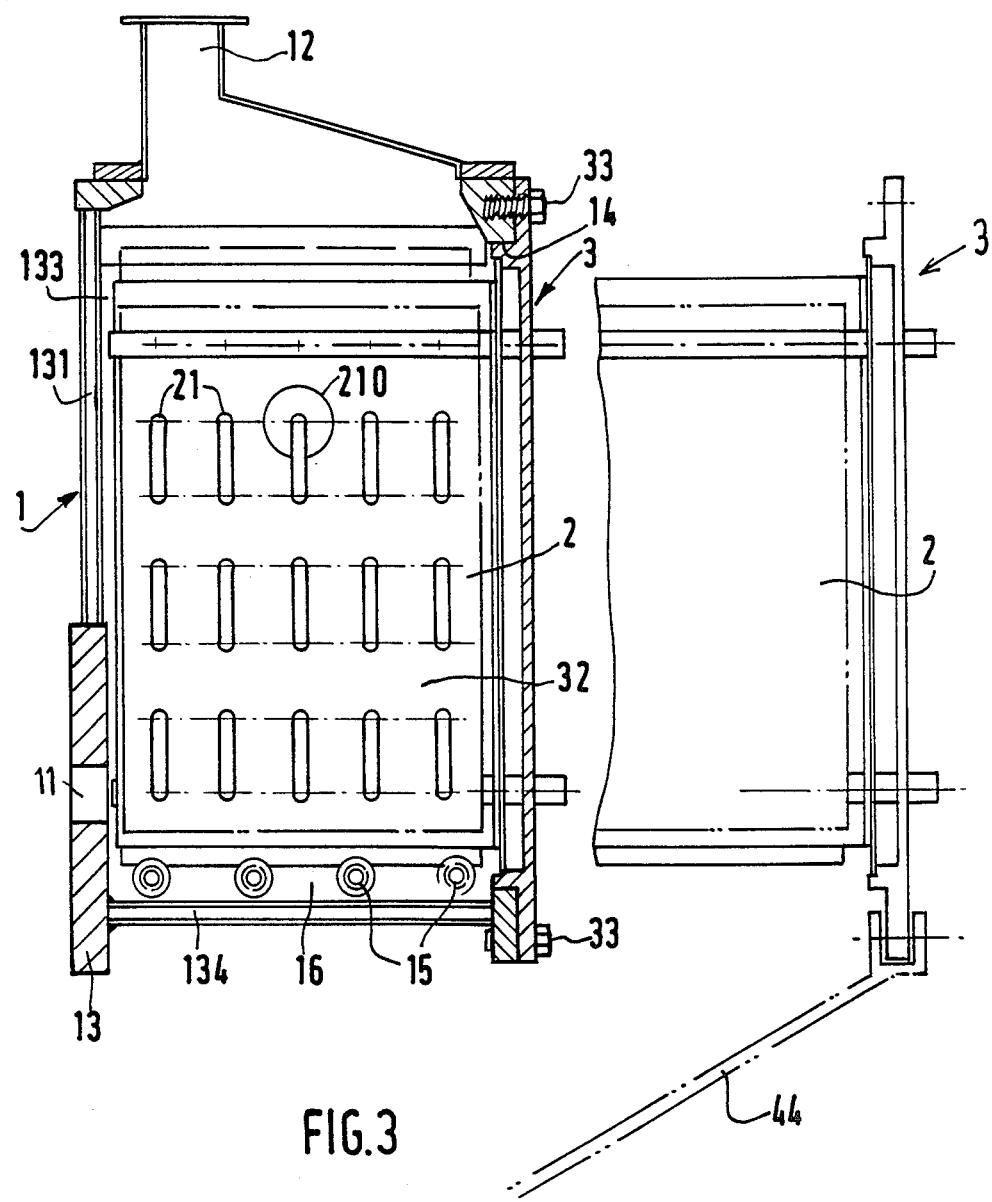
FIG. 3 shows, in its left hand part, a side view in section along line III—III of the manifold of FIG. 1, the rack and the cover being in position, and in its right hand part the corresponding view of the rack being removed from the manifold.

A heat exchanging exhaust manifold for an internal combustion engine will now be described. It includes a manifold case 1 for gathering together the exhaust gases from the internal combustion engine, through openings 11 connected to the cylinders of the engine, and feeding them to a duct 12 for connection to discharge means of a known type not shown.

The heat exchanging exhaust manifold also includes a cooling circuit 2, integral with a rack 3 which may be removably mounted inside the manifold casing 1.

The manifold casing 1 is of a substantially parallelepipedic shape including, with reference to the Figures, four vertical faces and two horizontal faces. A first vertical face includes a plate 13, fixed to the internal combustion engine and in which are formed the openings 11, here four in number, from which the exhaust gases are collected. The first vertical face also includes a wall 131. A second vertical face, opposite the first face including the plate 13 and wall 131 has a rectangular opening 14. The third and fourth vertical faces, as well as the lower horizontal face, in the Figures, include respectively walls 132, 133 and 134.

Walls 131 to 134 are doubled and adapted in a known way partially shown, for allowing the flow of a cooling fluid, here water.

The upper horizontal face, in the Figures, is provided with the duct 12 for connection to the discharge means not shown.

Opening 14 is adapted for allowing the passage of rack 3 and the mounting thereof inside the manifold casing 1.

Rack 3 includes a cover 31 adapted for hermetically closing the opening 14, and with a double wall for water cooling like the walls 131 to 134. Cover 31 may be fixed to the manifold casing 1, for closing the opening 14, by means of bolts 33. Rack 3 includes two support plates 32, vertical in the Figures, fixed to the cover 31.

The lower edges, on the Figures, of the support plates 32 bear on a set of rollers 15 mounted on two horizontal cross pieces 16, secured to the casing 1. The upper edges in the Figures, of the support plates 32 are guided by slides 17 fixed to the casing 1. A hinged stay 44, partially shown because conventional, supports the weight of rack 3.

The cooling circuit 2 includes, in a way known per se, a set of ducts 21, bent in the form of a serpentine and provided with fins 210. The set of ducts 21, supported by the support plates 32, is adapted so that the cooling fluid, here water, flows between an inlet 211 common to all the ducts 221 and an outlet 212 also common to all these ducts 21.

A switch 18, of a known microcontact type, fixed to casing 1 is actuated by an element 38, fixed to the rack 3, and it controls a relay circuit which is not shown because conventional, adapted for connecting the ignition system of the internal combustion engine to an electric ground, when the switch 18 is no longer actuated by the actuating element 38.

The assembly which has just been described operates in the following way. During normal operation, rack 3 is disposed so that the cooling circuit 3 is inside the manifold casing 1, and so that cover 31 sealingly closes the opening 14 by means of bolts 33. Using for example flexible pipes not shown, water is caused to flow both through the double walls 131 to 134 and through the cover 31 and through the ducts 21.

The exhaust gas, entering the manifold casing 1 through openings 11, and directed towards duct 12 are cooled both by passing here along the walls 131 to 134 and along the cover 31 and, much more efficiently, by the fins 210 of the ducts 21, disposed in the very path of the exhaust gases.

When the cooling circuit 2 is fouled up, in particular because of the particles contained in the exhaust gases which are deposited on fins 210, and generally when it is desired to proceed with maintenance, the internal combustion engine and the water flow is stopped, bolts 33 are removed so as to take out the rack 3, bearing on the rollers 15 sliding in slide 17. The weight of the rack 3 is then partially supported by the hinged stay 4.

If an attempt is made inadvertently to move rack 3 while the internal combustion engine is in operation, the actuating element 38 ceases to actuate the switch 18 and results in stopping the internal combustion engine.

This feature is particularly useful if the engine works in an explosive atmosphere, such as is the case for example on oil drilling platforms. In this case, for safety reasons, it is particularly important for the communication of the exhaust gases with the ambient atmosphere to take place solely through known explosion-proof discharge means, and therefore the engine must be imperatively stopped when rack 3 is moved and ceases to close the opening 14. This condition is always respected in the preferred embodiment of the manifold of the invention which has just been described.

In the case of such a system working in an explosive atmosphere, switch 18 and the electric and electronic circuits which it controls must be of the known "low" voltage and current type so that any risk of sparking is avoided.

In the embodiment described, the manifold casing 1 is provided with double walls 131 to 134 and a cover 31 cooled by water, of the type met with in known systems. Considering the high efficiency of cooling of the manifold of the invention through ducts 21 with fins 210 disposed in the path of the exhaust gases, this is not obligatory and the walls of the manifold casing 1 could be single.

In the embodiment described, the rack including the cooling means slides horizontally. This is not obligatory and it is possible in particular to provide a rack sliding vertically under the action, for example, of a lifting gear or jacks.

What is claimed is:

1. A heat exchanging exhaust manifold for internal combustion engines, comprising an exhaust gas discharge means, means for gathering the exhaust gases of the engine together and feeding them towards said discharge means, means for cooling said gases, said cooling means being removably mounted inside said manifold means, and means for controlling the stopping of the engine, actuated by a removal movement of said cooling means from said manifold means.

2. The exhaust manifold as claimed in claim 1, wherein said cooling means are integrally secured to a rack mounted for sliding inside said manifold means.

* * * * *